(12) United States Patent
Givoni et al.

(10) Patent No.: US 12,310,390 B2
(45) Date of Patent: May 27, 2025

(54) CONSUMABLE GEL DELIVERY METHOD FOR HEALTH INGREDIENTS

(71) Applicant: DOMALINA PTY LTD ATF THE DOMALINA UNIT TRUST, St. Kilda (AU)

(72) Inventors: Nathan Jacob Givoni, St Kilda (AU); David Alexander Vodden Morton, St. Kilda (AU); Simon Hayden Szewach, St. Kilda (AU); Paul Michael Wynne, St. Kilda (AU)

(73) Assignee: Domalina Pty Ltd ATF the Domalina Unit Trust (AU)

( * ) Notice: Subject to any disclaimer, the term of this patent is extended or adjusted under 35 U.S.C. 154(b) by 0 days.

(21) Appl. No.: 17/053,936

(22) PCT Filed: May 8, 2019

(86) PCT No.: PCT/IB2019/053787
§ 371 (c)(1),
(2) Date: Nov. 9, 2020

(87) PCT Pub. No.: WO2019/215641
PCT Pub. Date: Nov. 14, 2019

(65) Prior Publication Data
US 2021/0244061 A1   Aug. 12, 2021

(30) Foreign Application Priority Data

May 9, 2018   (AU) .................................. 2018901590

(51) Int. Cl.
| A23L 29/256 | (2016.01) |
| A23L 29/10 | (2016.01) |
| A23L 33/00 | (2016.01) |
| A23L 33/125 | (2016.01) |
| A23L 33/155 | (2016.01) |

(52) U.S. Cl.
CPC ............ *A23L 29/256* (2016.08); *A23L 29/10* (2016.08); *A23L 33/125* (2016.08); *A23L 33/155* (2016.08); *A23L 33/40* (2016.08)

(58) Field of Classification Search
CPC ...... A23L 33/40; A23L 33/125; A23L 33/155; A23L 29/10; A23L 29/256; A23L 2/52; A23L 29/20; A23L 33/15; A61K 9/0056; A61K 31/7004; A61K 47/36; A61P 3/08; A23V 2002/00; A23V 2200/14; A23V 2200/328; A23V 2250/61; A23V 2250/054; A23V 2250/154; A23V 2250/1882; A23V 2250/31; A23V 2250/161; A23V 2250/2132; A23V 2250/70; A23V 2250/1642; A23V 2250/5024; A23V 2250/5026; A23V 2250/02; A23V 2250/1578; A23V 2250/30

USPC ......................................................... 426/648
See application file for complete search history.

(56) References Cited

U.S. PATENT DOCUMENTS

| 3,892,870 A * | 7/1975 | Wood ..................... A23L 29/206 426/573 |
| 6,458,395 B1 * | 10/2002 | Emoto ..................... A23L 33/17 426/72 |
| 6,475,539 B1 * | 11/2002 | DeWille ..................... A23L 2/38 426/573 |
| 6,613,400 B1 * | 9/2003 | Murphy ............... A23C 13/125 427/570 |
| 2004/0059142 A1 * | 3/2004 | Bijl .......................... A23D 9/00 554/175 |
| 2005/0260322 A1 | 11/2005 | Takaichi et al. |
| 2005/0267221 A1 * | 12/2005 | Wellen ..................... A61K 31/12 514/688 |
| 2009/0148582 A1 * | 6/2009 | Leibovich ............... C12G 3/005 426/576 |
| 2011/0135791 A1 * | 6/2011 | Yang ....................... A23L 2/385 426/74 |
| 2011/0305811 A1 * | 12/2011 | Perlman ................... A23L 33/12 426/541 |
| 2012/0027693 A1 * | 2/2012 | Bean ....................... A61K 36/67 514/474 |

(Continued)

FOREIGN PATENT DOCUMENTS

| CN | 104853622 A * | 8/2015 | .............. A23L 2/38 |
| EP | 201074183 A2 | 2/2001 | |
| JP | 2008237186 A | 10/2008 | |
| WO | WO-17075672 A1 | 5/2017 | |
| WO | WO-2017075672 A1 * | 5/2017 | ............. G01N 33/66 |

OTHER PUBLICATIONS

NPL Sabater-Molina et al. (in J Physiol. Biochem 65(3): 315-328, 2009). (Year: 2009).*

(Continued)

*Primary Examiner* — Bhaskar Mukhopadhyay
(74) *Attorney, Agent, or Firm* — Fishman Stewart PLLC

(57) ABSTRACT

A dosage form, other than a 50 g or 75 g dose of glucose, that allows large dose combinations of two or more health ingredients selected from at least one of water soluble, water insoluble and lipid-based ingredients to be formulated together in a single dosage form, which is a drinkable gel with a volume of between 25 ml and 250 ml. The health ingredients are retained in a delivery system including water, a gelling agent that is a carbohydrate non-ionic gelled polymer gelling agent and a polyvalent ion gelled polymer gelling agent, and a pH adjuster. The carbohydrate non-ionic gelled polymer gelling agent is an agarose-based polymer gelling agent, the polyvalent ion gelled polymer gelling agent is an alginate-based polymer gelling agent.

19 Claims, 1 Drawing Sheet

(56) References Cited

U.S. PATENT DOCUMENTS

| | | | |
|---|---|---|---|
| 2013/0296233 A1* | 11/2013 | Theil | A23J 1/14 |
| | | | 514/5.5 |
| 2014/0141146 A1* | 5/2014 | Wang | A23L 29/27 |
| | | | 426/589 |
| 2016/0242450 A1 | 8/2016 | Magana | |

OTHER PUBLICATIONS

NPL Hiromitsu et al. (Machine Translation of JP 2015/204809 A) (Year: 2015).*

NPL RDA retrieved on Jun. 26, 2021. (Year: 2021).*

NPL Oz vs ml. (Retrieved on Jul. 7, 2021). (Year: 2021).*

NPL Hecht et al. (in Bio macromolecules 17: 2160-2167, 2016). (Year: 2016).*

NPL Google search result (Retrieved on Feb. 2, 2022 and considered the above NPL Hecht et al. from this search) (Year: 2022).*

Soumya Banerjee & Suvendu Bhattacharya (2012) Food Gels: Gelling Process and New Applications, Critical Reviews in Food Science and Nutrition, 52:4, 334-346, 2012. (Year: 2012).*

Google scholar Search retrieved on Nov. 14, 2022. (Year: 2022).*

NPL Chuang et al. ( International Journal of Polymer Science vol. 2017, Article ID 3902704, 9 pages) (Year: 2017).*

Google Search Result retrieved on Mar. 14, 2023. (Year: 2023).*

English abstract for JP-JP2008237186.

Saha, Dipjyoti et al., "Hydrocolloids as thickening and gelling agents in food: a critical review", Journal of Food Science and Technology, vol. 47, No. 6, Nov. 6, 2010.

\* cited by examiner

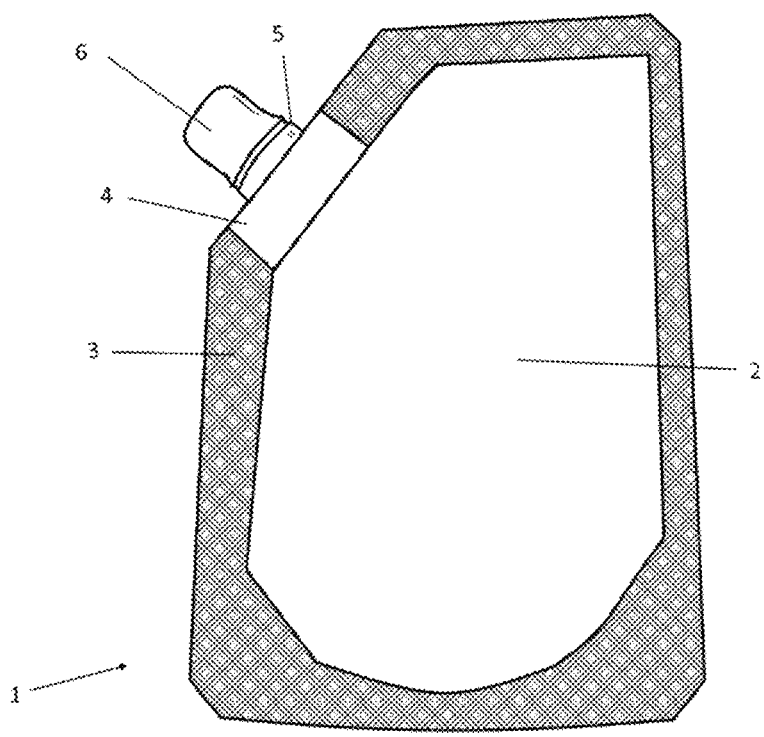

CONSUMABLE GEL DELIVERY METHOD FOR HEALTH INGREDIENTS

CROSS REFERENCE TO RELATED APPLICATIONS

This application claims priority to International Application No. PCT/IB2019/053787 filed on May 8, 2019, which claims priority to Australian Application No. AU 2018901590 filed on May 9, 2018, the contents of each of which is hereby incorporated by reference in their entirety.

TECHNICAL FIELD

This invention relates to a dosage form comprising one or more health ingredients, particularly, but not exclusively, nutritional ingredients.

The dosage form takes the form of a stable gel capable of delivering, particularly, multiple health ingredients in a single dosage form. The dosage form may be used in human or animal health.

The dosage form, particularly but not exclusively, is capable of delivering high doses of nutritional and other health ingredients including: water soluble, water insoluble and/or lipid soluble ingredients, in a single delivery vehicle which would not lend themselves particularly suited to delivery via tablets or capsules.

The dosage form has many benefits over current approaches to delivering health ingredients and the gel is particularly suited to delivering nutrients, food supplements, including meal replacements, and pharmaceuticals, in a number of different situations.

BACKGROUND

One of the most important factors in successfully developing health, particularly nutritional, products is ensuring patient compliance.

Currently, multiple product formats are used to deliver each of multiple e.g. nutritional or other health components. The varied nature and number of such products leads to significant variability in compliance.

These health products, including nutritional and nutraceutical products, may be preventative or curative in nature. They include: prescription products, over-the-counter (OTC) products, and nutraceuticals and dietary supplements including, for example, products containing: vitamins, minerals, elements, proteins, carbohydrates, lipids, extracts of plant origin e.g. traditional Chinese medicines (TCM) or other indigenous medicines etc, either alone or in combination.

Poor compliance may be a consequence of a need to take e.g. multiple tablets, capsules or other dosage forms e.g. a tablet containing multiple vitamins, a capsule containing omega 3, a drink containing soluble fibre etc.

Tablets and capsules may prove difficult to take (swallow), particularly for certain patient groups, such as children and the elderly. For large dose products, or difficult to formulate products, or combination products, large tablet size and multiple tablet doses create compliance issues.

Other problems which effect patient compliance include the taste, smell or organoleptic feel of a product. The organoleptic properties may relate to aspects of product taste, product consistency, product texture, product mouth feel, longevity of taste and any other organoleptic sensation.

Some products require a separate drink to facilitate swallowing or to wash residues from the mouth, or a separate solid composition to be co-administered.

Examples include: replacement sugar products for hypoglycaemia, and whey protein, which is poorly dispersed in liquids, and is additionally required in large volumes.

Also, a delivery device may be required, such as a spoon, a syringe, or some other metering device to aid consumption and dose delivery. The requirement of such an additional device may adversely impact on compliance.

Other factors influencing effectiveness include the packaging, the chemical or physical stability of the composition, the bioavailability of the components, the visual appeal, and convenience of delivery.

Alternative dosage forms to capsules and tablets include drinks or gels comprising liquids or semi-solids.

These "sports gels" are typically highly viscous pastes containing thickeners, such as, xanthan gum. However, because they do not set, these products leave tongue residues that linger, may be unpleasant, and can irritate the oropharyngeal area, which may lead to coughing or choking.

These highly viscous pastes or gel products are those that will flow but tend to flow slowly, with a high internal resistance and a consistency like honey or ketchup. These known highly viscous pastes may be Newtonian or non-Newtonian fluids and may be shear thinning or shear thickening in nature. However, they all share the property that despite a degree of resistance, they plastically deform under stress—even where such behaviour is also known to have a threshold, such as Bingham plastic behaviour. Typically, these viscous pastes have a viscosity measurable between about 5000 and about 50,000 cP.

The term "set", as used herein refers to jelly materials that set, and do not exhibit plastic behaviour upon stress, but rather behave elastically upon stress, to a failure point where the structure of the jelly breaks to irreversibly create new interfaces.

Applicant has, as is disclosed in WO 2017/075672, previously developed a novel glucose containing product to facilitate the delivery of a dose of 50 g or 75 g of glucose for conducting a glucose tolerance (or similar) test. The dose is dissolved in 100 ml of water and gelled using a mix of agar (0.75 g) and locust bean gum (0.25 g).

The glucose is dissolved in water and gelled using one or more carbohydrate based gelling agents: agar or agar and locust bean gum.

This novel dosage form had the advantage, compared to the exiting liquid dosage test forms, that the intense sweet taste of the glucose was masked, such that a subject taking the glucose did not suffer nausea, sickness, vomiting, fainting and other forms of stress. It is also delivered the dose in a smaller volume than the traditional liquid test.

Applicant has now determined that this general approach of using setting gels to produce a delivery form having a defined bloom grade can be applied more broadly to facilitate the delivery of, for example, a wide range of health ingredients, other than a fixed-does of glucose for diagnostic purposes.

They have further determined that, by using particular combinations of gelling agents, further significant benefits can be obtained.

SUMMARY

In accordance with a first aspect of the invention there is provided an oral dosage form comprising one or multiple health ingredients, other than a 50 g or 75 g dose of glucose, which is a drinkable gel, wherein the health ingredients are retained in a delivery system comprising:
water,
a gelling agent, which is a carbohydrate non-ionic gelled polymer gelling agent and/or a polyvalent ion gelled polymer gelling agent, and
a pH adjuster
which components are present in amounts which ensure hydration of, and the formation of a firm gel with a bloom grade of between 100 and 250, which firm gel can be sheared to make it more fluid when ingested, such that it is a drinkable gel.

A firm gel is a "set" gel or jelly characterised in an industrial and scientific context by the Bloom test, which is used to provide a relative firmness and strength of these gels. This test originated in 1925 by Oscar T. Bloom. The test determines the weight in grams needed by a specified plunger (normally with a diameter of 0.5 inch (11 mm)) to depress the surface of the gel by 4 mm, without irreversibly breaking the gel to create new interfaces, at a specified temperature. This result is the Bloom grade. A higher number indicates a stiffer product. For example, gelatin used in food usually runs from 125 Bloom to 250 Bloom.

For the purpose of this document the terms gel and jelly are interchangeable.

A set gel or jelly is somewhat elastic which means that under stress they deform, but when that stress is released they substantially return back to their original form. For example, if gently pressed by the underside of a spoon, a set jelly will be pushed down, but when the spoon is removed the original surface returns to its original position. It is not plastic, whereby under the same stress the surface would be deformed and then remain deformed once the pressure is removed. Set gels or jellys, rather than deform plastically, will fail by breaking irreversibly to create a new interface if the stress is further increased beyond its failure point The oral dosage form of the invention may typically be provided in a volume of between 25 ml and 250 ml, depending on use, and is delivered from a container, typically a pouch, though a spout or straw, such that a sucking action shears the gel, such that it becomes more fluid with new interfaces being created, sometimes with the release of some water.

The shearing and creation of new interfaces has the advantage that it aids the delivery whilst maintaining taste masking.

In accordance with a second aspect of the present invention there is provided an oral dosage form comprising one or more health ingredients which is a drinkable gel wherein the health ingredients are retained in a delivery system comprising:
water,
a first gelling agent, which is a carbohydrate, non-ionic gelled polymer gelling agent,
a second gelling agent, which is a polyvalent ion gelled polymer gelling agent, and
a pH adjuster
which components are present in amounts which ensure hydration of, and the formation of a firm gel with a bloom grade of between 100 and 250, which firm gel can be sheared to make it more fluid when ingested, such that it is a drinkable gel.

In both the first and second aspects of the invention the oral dosage form is delivered through a narrow opening, such as a spout or straw and is sucked or squeezed, and the resulting delivery force and or mouth action shears the gel resulting in the creation of new interfaces making the formulation easy to ingest by drinking.

The carbohydrate gelling agent may be one of an agarose-based polymer gelling agent, or locust bean gum. Most preferably, it is an agarose-based polymer gelling agent, such as, an agar.

The carbohydrate gelling agent used, may advantageously, also behave as an emulsifier, so that significant additional emulsifiers are not required in formulations containing non-polar ingredients such as lipids, for example, omega oils, and non-water soluble vitamins, such as, vitamin D and vitamin E.

The polyvalent ion gelled polymer is most preferably an alginate-based polymer gelling agent, such as, but not limited to calcium alginate. Alternatives include, guar gum, gellan gum, xanthan gum, pectin and kudzu.

In a particularly favoured embodiment, the gelling agents comprise agar as the primary gelling agent and calcium alginate as the secondary gelling agent. This combination proved particularly versatile allowing combinations of two or more of water soluble, water insoluble and/or lipid-based ingredients to be formulated together in a single dosage form.

These two fundamentally different gelling agents provide a set gel structure via different interaction mechanisms. The advantage of the combination is its versatility as a base, as the combination overcome scenarios where gelation would otherwise by inhibited by the presence of different ingredients.

Agar consists of a mixture of two polysaccharides: agarose and agaropectin, with agarose making up about 70% of the mixture. Agarose is a linear polymer, made up of repeating units of agarobiose, a disaccharide made up of D-galactose and 3,6-anhydro-L-galactopyranose. Agaropectin is a heterogeneous mixture of smaller molecules that occur in lesser amounts and is made up of alternating units of D-galactose and L-galactose heavily modified with acidic side-groups, such as sulphate and pyruvate. Any known variant of Agar may be used in the invention.

Agar exhibits hysteresis, melting at 85° C. and solidifying at from 32° C. to 40° C. This property lends a suitable balance between easy melting and good gel stability, at relatively high temperatures. Agar is more appropriate than other carbohydrate based solidifying agents that also melt at around this temperature, such as gelatine.

The gelling also helps provide stability, at room temperature (and above), meaning cold storage can be avoided.

The most common alginate used in food is sodium alginate. In order to form a gel, sodium alginate needs to come into contact with divalent ions, such as calcium (Ca2+). When sodium alginate is added to a solution of a calcium salt, such as the chloride or citrate, a gel forms as the sodium ions (Na+) are exchanged with calcium ions (Ca2+) and the polymers become crosslinked. The divalent ions, such as calcium, are able to form crosslinks between alginate polymers because they can form two bonds, whereas monovalent ions, such as sodium, can only form one bond. The longer the alginate is in contact with the divalent ion solution, the more rigid the gel will become, as more crosslinks are formed. Also, depending on the concentration of divalent ions, the gels are either thermo-reversible (at low concentrations) or thermos-irreversible (at high concentrations).

Alginic acid is a linear copolymer with homo-polymeric blocks of (1-4)-linked β-D-mannuronate (M), and its C-5 epimer, α-L-guluronate (G), which are covalently linked together in different sequences or blocks.

Sodium alginate is the sodium salt of alginic acid. Its empirical formula is $NaC_6H_7O_6$. Sodium alginate is a gum, extracted from the cell walls of brown algae.

Potassium alginate is a chemical compound that is the potassium salt of alginic acid. Its empirical chemical formula is $KC_6H_7O_6$.

Calcium alginate, made from sodium alginate from which the sodium ion has been removed and replaced with calcium, has the chemical formula $C_{12}H_{14}CaO_{12}$.

The gel formulation of the invention can be used to deliver one or more of:
  i) Water soluble ingredients;
  ii) Water insoluble ingredients; and
  iii) Lipids; or
  iv) A meal replacement, or the key components thereof, such as proteins, carbohydrates, fats, minerals, vitamins, and fibre or their combinations.

In a first embodiment the dosage form of the invention proves very effective at facilitating the delivery of a quick release sugar, e.g. glucose, to address a "hypoglycaemic event" in diabetic patients. The sugar is most preferably delivered with one or more other health beneficial ingredients and can be tailored to groups of "at risk" subjects such as: children, adults, pregnant women, or the elderly.

Typically, but not essentially, a dose of between 1 g and 40 g of ingredients is delivered in a volume of between 25 and 45 ml of gel.

The delivery of a single or primary ingredient or medicine in this (including much lower amounts of active) manner may have benefits in other emergency type situations, such as, for example: epilepsy, allergic reaction, migraine, chest pain, asthma etc.

The base gel formulation can be used to load multiple health ingredients, including medicines, into a simple to take, simple to use dosage form which can retain ingredients which would typically be difficult to formulate in a single dosage form due to their different properties and can be administered orally by squeezing or sucking the gel from its container.

In a second embodiment the dosage form comprises health ingredients targeted to address the particular health requirements of targeted subject groups based on e.g. lifestyle. Non-limiting examples include:

Students—where a gel has been formulated to assist studying, and may comprise nutrients to enhance brain cell function, increase alertness, memory, concentration, focus and endurance. It also can help reduce stress;

Outdoor workers—where a gel has been formulated to provide natural anti-inflammatories and antioxidants, assist with muscular relaxation and recovery post work, as well as alertness, focus and the provision of energy;

Office workers—where a gel has been formulated to increase focus and endurance;

Shift workers—where a gel has been formulated to trigger the melatonin pathway for regulation of circadian rhythms, whilst also providing nutrients and antioxidants to aid brain and muscle recovery;

Underground workers—where a gel has been formulated to assist with the physical demands of the job. Increases alertness, endurance and recovery whilst compensating for the lack of sunlight with Vitamin D;

Travelers—where a gel has been formulated to reduce stress, tiredness and jetlag associated with travel, whilst assisting with the regulation of circadian rhythms;

Sportsman—where a gel has been formulated to increase energy, concentration, alertness and reactive time, so people can perform at their best from the start of a game or workout;

Elderly—where a gel has been designed to trigger the curcumin based pathways, to improve memory and brain function, with additional nutrients focused on joints, bones and eyesight;

Drivers—where a gel has been formulated to enhance brain cell function and assist with the physical demands of long haul travel. It increases alertness and endurance, whilst compensating for the lack of sunlight with Vitamin D.

Clearly this is merely an example of groups where an easy to take gel product has benefits due to the fact it can contain a range of health ingredients in a relatively small volume (generally less than 50 ml and preferably about 30-40 ml).

Other examples include adding stimulants such as caffeine, developing products to assist sleep, address hangovers, increase sexual performance etc.

In a third embodiment the dosage form comprises health ingredients targeted to provide meal replacement.

In this embodiment the focus is on delivering particularly carbohydrates, proteins and fats in addition to vitamins and minerals.

In this, and the other embodiments, it is desirable to ensure the gel contains sufficient of the desired ingredient to be effective. Typically the gel of the invention seeks to provide a Recommended Daily Intake (RDI) of one or more ingredients or at least a significant proportion thereof such at 33% (a third dose), 50% (a half dose) or in some cases 100% a complete daily dose. Alternatively, the amount may be referred to as as Adequate Intake (AI).

This data is set out in Tables 1 to 4 below, which set out the RDI or AI for key components by group, gender and age.

Table 1 provides figures for Protein, and Dietary fats;
Table 2 provides figures for Carbohydrate, Dietary fibre and water;
Tables 3a, b and c provide figures for Vitamins; and
Tables 4a, b and c provide figures for Minerals:

TABLE 1

Protein, and Dietary fats

| Age Group | Gender | Age Range lower | Age Range upper | Protein g/day | Linoleic (n − 6) g/day | α-linolenic (n − 3) g/day | LC n − 3 (DHA/EPA/DPA) mg/day | Total fats g/day |
|---|---|---|---|---|---|---|---|---|
| | | | | AI | AI | AI | AI | % of total energy |
| Infants | | 0 m | 6 m | 10 | 4.4 | 0.5 | — | 30% |
| Infants | | 7 m | 12 m | 14 | 4.6 | 0.5 | — | 30% |

TABLE 1-continued

Protein, and Dietary fats

| Age Group | Gender | Age Range lower | Age Range upper | Protein g/day | Dietary fats Linoleic (n – 6) g/day | Dietary fats α-linolenic (n – 3) g/day | Dietary fats LC n – 3 (DHA/EPA/DPA) mg/day | Total fats g/day |
|---|---|---|---|---|---|---|---|---|
| | | | | RDI | AI | AI | AI | % of total energy |
| Children | | 1 y | 3 y | 14 | 5 | 0.5 | 40 | 30% |
| Children | | 4 y | 8 y | 20 | 8 | 0.8 | 55 | 30% |
| Boys | male | 9 y | 13 y | 40 | 10 | 1 | 70 | 30% |
| Boys | male | 14 y | 18 y | 65 | 12 | 1.2 | 125 | 30% |
| Girls | female | 9 y | 13 y | 35 | 8 | 0.8 | 70 | 30% |
| Girls | female | 14 y | 18 y | 45 | 8 | 0.8 | 85 | 30% |
| Men | male | 19 y | 30 y | 64 | 13 | 1.3 | 160 | 30% |
| Men | male | 31 y | 50 y | 64 | 13 | 1.3 | 160 | 30% |
| Men | male | 51 y | 70 y | 64 | 13 | 1.3 | 160 | 30% |
| Men | male | 71 y | | 81 | 13 | 1.3 | 160 | 30% |
| Women | female | 19 y | 30 y | 46 | 8 | 0.8 | 90 | 30% |
| Women | female | 31 y | 50 y | 46 | 8 | 0.8 | 90 | 30% |
| Women | female | 51 y | 70 y | 46 | 8 | 0.8 | 90 | 30% |
| Women | female | 71 y | | 57 | 8 | 0.8 | 90 | 30% |
| Pregnancy | female | 14 y | 18 y | 58 | 10 | 1 | 110 | 30% |
| Pregnancy | female | 19 y | 30 y | 60 | 10 | 1 | 115 | 30% |
| Pregnancy | female | 31 y | 50 y | 60 | 10 | 1 | 115 | 30% |
| Lactation | female | 14 y | 18 y | 63 | 12 | 1.2 | 140 | 30% |
| Lactation | female | 19 y | 30 y | 67 | 12 | 1.2 | 145 | 30% |
| Lactation | female | 31 y | 50 y | 67 | 12 | 1.2 | 145 | 30% |

TABLE 2

Carbohydrate, Dietary fibre and Water

| Age Group | Gender | Age Range lower | Age Range upper | Carbohydrate g/day | Dietary Fibre g/day | Total water (figure in brackets is fluid component only) L/day |
|---|---|---|---|---|---|---|
| | | | | AI | AI | AI |
| Infants | | 0 m | 6 m | 60 | NP | 0.7 (0.7) |
| Infants | | 7 m | 12 m | 95 | NP | 0.8 (0.6) |
| | | | | % of total energy | AI | AI |
| Children | | 1 y | 3 y | 45-65% | 14 | 1.4 (1.0) |
| Children | | 4 y | 8 y | 45-65% | 18 | 1.6 (1.2) |
| Boys | male | 9 y | 13 y | 45-65% | 24 | 2.2 (1.6) |
| Boys | male | 14 y | 18 y | 45-65% | 28 | 2.7 (1.9) |
| Girls | female | 9 y | 13 y | 45-65% | 20 | 1.9 (1.4) |
| Girls | female | 14 y | 18 y | 45-65% | 22 | 2.2 (1.6) |
| Men | male | 19 y | 30 y | 45-65% | 30 | 3.4 (2.6) |
| Men | male | 31 y | 50 y | 45-65% | 30 | 3.4 (2.6) |
| Men | male | 51 y | 70 y | 45-65% | 30 | 3.4 (2.6) |
| Men | male | 71 y | | 45-65% | 30 | 3.4 (2.6) |
| Women | female | 19 y | 30 y | 45-65% | 25 | 2.8 (2.1) |
| Women | female | 31 y | 50 y | 45-65% | 25 | 2.8 (2.1) |
| Women | female | 51 y | 70 y | 45-65% | 25 | 2.8 (2.1) |
| Women | female | 71 y | | 45-65% | 25 | 2.8 (2.1) |
| Pregnancy | female | 14 y | 18 y | 45-65% | 25 | 2.4 (1.8) |
| Pregnancy | female | 19 y | 30 y | 45-65% | 28 | 3.1 (2.3) |
| Pregnancy | female | 31 y | 50 y | 45-65% | 28 | 3.1 (2.3) |
| Lactation | female | 14 y | 18 y | 45-65% | 27 | 2.9 (2.3) |
| Lactation | female | 19 y | 30 y | 45-65% | 30 | 3.5 (2.6) |
| Lactation | female | 31 y | 50 y | 45-65% | 30 | 3.5 (2.6) |

TABLE 3a

Vitamins

| Age Group | Gender | Age Range lower | Age Range upper | Thiamin mg/day | Riboflavin mg/day | Niacin mg/day niacin equivalents | Vitamin B6 mg/day |
|---|---|---|---|---|---|---|---|
| | | | | AI | AI | AI | AI |
| Infants | | 0 m | 6 m | 0.2 | 0.3 | 2 | 0.1 |
| Infants | | 7 m | 12 m | 0.3 | 0.4 | 4 | 0.3 |
| | | | | RDI | RDI | RDI | RDI |
| Children | | 1 y | 3 y | 0.5 | 0.5 | 6 | 0.5 |
| Children | | 4 y | 8 y | 0.6 | 0.6 | 8 | 0.6 |
| Boys | male | 9 y | 13 y | 0.9 | 0.9 | 12 | 1 |
| Boys | male | 14 y | 18 y | 1.2 | 1.3 | 16 | 1.3 |
| Girls | female | 9 y | 13 y | 0.9 | 0.9 | 12 | 1 |
| Girls | female | 14 y | 18 y | 1.1 | 1.1 | 14 | 1.2 |
| Men | male | 19 y | 30 y | 1.2 | 1.3 | 16 | 1.3 |
| Men | male | 31 y | 50 y | 1.2 | 1.3 | 16 | 1.3 |
| Men | male | 51 y | 70 y | 1.2 | 1.3 | 16 | 1.7 |
| Men | male | 71 y | | 1.2 | 1.6 | 16 | 1.7 |
| Women | female | 19 y | 30 y | 1.1 | 1.1 | 14 | 1.3 |
| Women | female | 31 y | 50 y | 1.1 | 1.1 | 14 | 1.3 |
| Women | female | 51 y | 70 y | 1.1 | 1.1 | 14 | 1.5 |
| Women | female | 71 y | | 1.1 | 1.3 | 14 | 1.5 |
| Pregnancy | female | 14 y | 18 y | 1.4 | 1.4 | 18 | 1.9 |
| Pregnancy | female | 19 y | 30 y | 1.4 | 1.4 | 18 | 1.9 |
| Pregnancy | female | 31 y | 50 y | 1.4 | 1.4 | 18 | 1.9 |
| Lactation | female | 14 y | 18 y | 1.4 | 1.6 | 17 | 2 |
| Lactation | female | 19 y | 30 y | 1.4 | 1.6 | 17 | 2 |
| Lactation | female | 31 y | 50 y | 1.4 | 1.6 | 17 | 2 |

TABLE 3b

| | | | Vitamins | | | | |
|---|---|---|---|---|---|---|---|
| | Age Range | | Folate (as dietary folate equivs) | Pantothenic acid | Biotin | Vitamin A (retinol equivalents) | Vitamin C |
| Gender | lower | upper | μg/day | mg/day | μg/day | μg/day | mg/day |
| | | | AI | AI | AI | AI | AI |
| | 0 m | 6 m | 65 | 1.7 | 5 | 250 (as retinol) | 25 |
| | 7 m | 12 m | 80 | 2.2 | 6 | 430 | 30 |
| | | | RDI | AI | AI | RDI | RDI |
| | 1 y | 3 y | 150 | 3.5 | 8 | 300 | 35 |
| | 4 y | 8 y | 200 | 4 | 12 | 400 | 35 |
| male | 9 y | 13 y | 300 | 5 | 20 | 600 | 40 |
| male | 14 y | 18 y | 400 | 6 | 30 | 900 | 40 |
| female | 9 y | 13 y | 300 | 4 | 20 | 600 | 40 |
| female | 14 y | 18 y | 400 | 4 | 25 | 700 | 40 |
| male | 19 y | 30 y | 400 | 6 | 30 | 900 | 45 |
| male | 31 y | 50 y | 400 | 6 | 30 | 900 | 45 |
| male | 51 y | 70 y | 400 | 6 | 30 | 900 | 45 |
| male | 71 y | | 400 | 6 | 30 | 900 | 45 |
| female | 19 y | 30 y | 400 | 4 | 25 | 700 | 45 |
| female | 31 y | 50 y | 400 | 4 | 25 | 700 | 45 |
| female | 51 y | 70 y | 400 | 4 | 25 | 700 | 45 |
| female | 71 y | | 400 | 4 | 25 | 700 | 45 |
| female | 14 y | 18 y | 600 | 5 | 30 | 700 | 55 |
| female | 19 y | 30 y | 600 | 5 | 30 | 800 | 60 |
| female | 31 y | 50 y | 600 | 5 | 30 | 800 | 60 |
| female | 14 y | 18 y | 500 | 6 | 35 | 1,100 | 80 |
| female | 19 y | 30 y | 500 | 6 | 35 | 1,100 | 85 |
| female | 31 y | 50 y | 500 | 6 | 35 | 1,100 | 85 |

TABLE 3c

| | | Vitamins | | | | | | |
|---|---|---|---|---|---|---|---|---|
| Age Group | Gender | Age Range lower | Age Range upper | Vitamin D μg/day | Vitamin E (α-tocopherol equivs) mg/day | Vitamin K μg/day | Choline mg/day | Calcium mg/day |
| | | | | AI | AI | AI | AI | AI |
| Infants | | 0 m | 6 m | 5 | 4 | 2 | | 125 |
| Infants | | 7 m | 12 m | 5 | 5 | 2.5 | | 150 |
| | | | | AI | AI | AI | | AI |
| Children | | 1 y | 3 y | 5 | 5 | 25 | 200 | |
| Children | | 4 y | 8 y | 5 | 6 | 35 | 250 | |
| Boys | male | 9 y | 13 y | 5 | 9 | 45 | 375 | |
| Boys | male | 14 y | 18 y | 5 | 10 | 55 | 550 | |
| Girls | female | 9 y | 13 y | 5 | 8 | 45 | 375 | |
| Girls | female | 14 y | 18 y | 5 | 8 | 55 | 400 | |
| Men | male | 19 y | 30 y | 5 | 10 | 70 | 550 | |
| Men | male | 31 y | 50 y | 5 | 10 | 70 | 550 | |
| Men | male | 51 y | 70 y | 10 | 10 | 70 | 550 | |
| Men | male | 71 y | | 15 | 10 | 70 | 550 | |
| Women | female | 19 y | 30 y | 5 | 7 | 60 | 425 | |
| Women | female | 31 y | 50 y | 5 | 7 | 60 | 425 | |
| Women | female | 51 y | 70 y | 10 | 7 | 60 | 425 | |
| Women | female | 71 y | | 15 | 7 | 60 | 425 | |
| Pregnancy | female | 14 y | 18 y | 5 | 8 | 60 | 415 | |
| Pregnancy | female | 19 y | 30 y | 5 | 7 | 60 | 440 | |
| Pregnancy | female | 31 y | 50 y | 5 | 7 | 60 | 440 | |
| Lactation | female | 14 y | 18 y | 5 | 12 | 60 | 525 | |
| Lactation | female | 19 y | 30 y | 5 | 11 | 60 | 550 | |
| Lactation | female | 31 y | 50 y | 5 | 11 | 60 | 550 | |

TABLE 4a

| | | Minerals | | | | | |
|---|---|---|---|---|---|---|---|
| Age Group | Gender | Age Range lower | Age Range upper | Phosphorus mg/day | Zinc mg/day | Iron mg/day | Magnesium mg/day | Iodine μg/day |
| | | | | AI | AI | AI | AI | AI |
| Infants | | 0 m | 6 m | 100 | 2 | 0.2 | 30 | 90 |
| Infants | | 7 m | 12 m | 275 | 3 | 11 | 75 | 110 |
| | | | | RDI | RDI | RDI | RDI | RDI |
| Children | | 1 y | 3 y | 460 | 3 | 9 | 80 | 90 |
| Children | | 4 y | 8 y | 500 | 4 | 10 | 130 | 90 |
| Boys | male | 9 y | 13 y | 1,250 | 6 | 8 | 240 | 120 |
| Boys | male | 14 y | 18 y | 1,250 | 13 | 11 | 410 | 150 |
| Girls | female | 9 y | 13 y | 1,250 | 6 | 8 | 240 | 120 |
| Girls | female | 14 y | 18 y | 1,250 | 7 | 15 | 360 | 150 |
| Men | male | 19 y | 30 y | 1,000 | 14 | 8 | 400 | 150 |
| Men | male | 31 y | 50 y | 1,000 | 14 | 8 | 420 | 150 |
| Men | male | 51 y | 70 y | 1,000 | 14 | 8 | 420 | 150 |
| Men | male | 71 y | | 1,000 | 14 | 8 | 420 | 150 |
| Women | female | 19 y | 30 y | 1,000 | 8 | 18 | 310 | 150 |
| Women | female | 31 y | 50 y | 1,000 | 8 | 18 | 320 | 150 |
| Women | female | 51 y | 70 y | 1,000 | 8 | 8 | 320 | 150 |
| Women | female | 71 y | | 1,000 | 8 | 8 | 320 | 150 |
| Pregnancy | female | 14 y | 18 y | 1,250 | 10 | 27 | 400 | 220 |
| Pregnancy | female | 19 y | 30 y | 1,000 | 11 | 27 | 350 | 220 |
| Pregnancy | female | 31 y | 50 y | 1,000 | 11 | 27 | 360 | 220 |
| Lactation | female | 14 y | 18 y | 1,250 | 11 | 10 | 360 | 270 |
| Lactation | female | 19 y | 30 y | 1,000 | 12 | 9 | 310 | 270 |
| Lactation | female | 31 y | 50 y | 1,000 | 12 | 9 | 320 | 270 |

TABLE 4b

Minerals

| Age Group | Gender | Age Range lower | Age Range upper | Selenium μg/day | Molybdenum μg/day | Copper mg/day | Chromium μg/day |
|---|---|---|---|---|---|---|---|
| | | | | AI | AI | AI | AI |
| Infants | | 0 m | 6 m | 12 | 2 | 0.2 | 0.2 |
| Infants | | 7 m | 12 m | 15 | 3 | 0.22 | 5.5 |
| | | | | RDI | RDI | AI | AI |
| Children | | 1 y | 3 y | 25 | 17 | 0.7 | 11 |
| Children | | 4 y | 8 y | 30 | 22 | 1 | 15 |
| Boys | male | 9 y | 13 y | 50 | 34 | 1.3 | 25 |
| Boys | male | 14 y | 18 y | 70 | 43 | 1.5 | 35 |
| Girls | female | 9 y | 13 y | 50 | 34 | 1.1 | 21 |
| Girls | female | 14 y | 18 y | 60 | 43 | 1.1 | 24 |
| Men | male | 19 y | 30 y | 70 | 45 | 1.7 | 35 |
| Men | male | 31 y | 50 y | 70 | 45 | 1.7 | 35 |
| Men | male | 51 y | 70 y | 70 | 45 | 1.7 | 35 |
| Men | male | 71 y | | 70 | 45 | 1.7 | 35 |
| Women | female | 19 y | 30 y | 60 | 45 | 1.2 | 25 |
| Women | female | 31 y | 50 y | 60 | 45 | 1.2 | 25 |
| Women | female | 51 y | 70 y | 60 | 45 | 1.2 | 25 |
| Women | female | 71 y | | 60 | 45 | 1.2 | 25 |
| Pregnancy | female | 14 y | 18 y | 65 | 50 | 1.2 | 30 |
| Pregnancy | female | 19 y | 30 y | 65 | 50 | 1.3 | 30 |
| Pregnancy | female | 31 y | 50 y | 65 | 50 | 1.3 | 30 |
| Lactation | female | 14 y | 18 y | 75 | 50 | 1.4 | 45 |
| Lactation | female | 19 y | 30 y | 75 | 50 | 1.5 | 45 |
| Lactation | female | 31 y | 50 y | 75 | 50 | 1.5 | 45 |

TABLE 4c

Minerals

| Age Group | Gender | Age Range lower | Age Range upper | Manganese mg/day | Fluoride mg/day | Sodium mg/day | Potassium mg/day |
|---|---|---|---|---|---|---|---|
| | | | | AI | AI | AI | AI |
| Infants | | 0 m | 6 m | 0.003 | NP | 120 | 400 |
| Infants | | 7 m | 12 m | 0.6 | 0.5 | 170 | 700 |
| | | | | AI | AI | AI | AI |
| Children | | 1 y | 3 y | 2 | 0.6 | 200-400 | 2,000 |
| Children | | 4 y | 8 y | 2.5 | 1.1 | 300-600 | 2,300 |
| Boys | male | 9 y | 13 y | 3 | 2 | 400-800 | 3,000 |
| Boys | male | 14 y | 18 y | 3.5 | 3 | 460-920 | 3,600 |
| Girls | female | 9 y | 13 y | 2.5 | 2 | 400-800 | 2,500 |
| Girls | female | 14 y | 18 y | 3 | 3 | 460-920 | 2,600 |
| Men | male | 19 y | 30 y | 5.5 | 4 | 460-920 | 3,800 |
| Men | male | 31 y | 50 y | 5.5 | 4 | 460-920 | 3,800 |
| Men | male | 51 y | 70 y | 5.5 | 4 | 460-920 | 3,800 |
| Men | male | 71 y | | 5.5 | 4 | 460-920 | 3,800 |
| Women | female | 19 y | 30 y | 5 | 3 | 460-920 | 2,800 |
| Women | female | 31 y | 50 y | 5 | 3 | 460-920 | 2,800 |
| Women | female | 51 y | 70 y | 5 | 3 | 460-920 | 2,800 |
| Women | female | 71 y | | 5 | 3 | 460-920 | 2,800 |
| Pregnancy | female | 14 y | 18 y | 5 | 3 | 460-920 | 2,800 |
| Pregnancy | female | 19 y | 30 y | 5 | 3 | 460-920 | 2,800 |
| Pregnancy | female | 31 y | 50 y | 5 | 3 | 460-920 | 2,800 |
| Lactation | female | 14 y | 18 y | 5 | 3 | 460-920 | 3,200 |
| Lactation | female | 19 y | 30 y | 5 | 3 | 460-920 | 3,200 |
| Lactation | female | 31 y | 50 y | 5 | 3 | 460-920 | 3,200 |

The Proteins optionally include: milk protein concentrate, whey protein concentrate, soya protein isolate, and sodium caseinate which may additionally include Amino Acids such as one or more of: L-Glutamine, L-Glycine, L-Leucine, L-Isoleucine, L-Valine, Beta Alanine, L-Arginine, and Taurine.

The Carbohydrates optionally include, for example: maltodextrin, inulin, fructose, and glucose syrup.

The Dietary Fats optionally include: vegetable fats and oils, fish oils, coconut oil, mono and diglycerides of fatty acids, and lecithin.

The Vitamins optionally include: Vitamin C (Ascorbic Acid), Vitamin K (Menaquinone-7), Vitamin E (dl-Alpha Tocopheryl Acetate), Niacin (Niacinamide), Vitamin A (Retinyl Acetate), Pantothenic Acid (Calcium D-Pantothenate), D-Biotin, Folic Acid, Vitamin D (Cholecalciferol), Vitamin B6 (Pyridoxine Hydrochloride), Riboflavin (Riboflavin 5 Phosphate Sodium), Thiamin (Thiamin Hydrochloride), Vitamin B12 (Cyanocobalamin), Creatine Monohydrate, beta carotene, lutein, lycopene oleoresin, choline chloride, L-carnitine, nicotinamide, calcium D-pantothenate, riboflavin, pyridoxine hydrochloride, pteroylmonoglutamic acid, phytomenadione, resveratrol. Alpha Ketoglutarate, Calcium Hydroxy Methylbutyrate (HMB), Tricreatine Malate.

The Minerals optionally include Essential and Trace Mineral sources and salts such as one or more of: Tri-potassium Citrate, Sodium Chloride, Trisodium Citrate, Magnesium Oxide, Zinc Gluconate, Iron Fumarate, Manganese Gluconate, Copper Gluconate, Potassium Iodide, Sodium Molybdate, Chromium Picolinate, sodium selenite, chromium chloride, potassium iodide, sodium fluoride, sodium chloride, potassium chloride, calcium hydroxide, sodium ascorbate, magnesium hydroxide potassium hydroxide, ferrous lactate, zinc sulphate, manganese sulphate, and Phosphates such as one or more of sodium triphosphate, tricalcium phosphate, potassium phosphate, Other components may include:
Antioxidants, such as one or more of: ascorbyl palmitate, alpha tocopherol.
A pH modifier, such as one or more of: citric acid, and ascorbic acid, and
Flavourings and Sweeteners.

Thus, the gel may be used for disaster relief, being air dropped or otherwise delivered to the place of need.

Generally, these gel packages will be produced in larger volume, with size of up to 250 ml, but more typically 75 ml to 150 ml and will contain a quarter to a half of the Recommended Daily Intake of key nutritional ingredients such as Protein, Carbohydrates, and Dietary fats and optionally additionally key vitamins and minerals, as set out with reference to the tables above, Alternatively, minimal or speciality nutrition feeds can be produced to support slimmer's and speciality meal/nutrition products, produced for elite athletes or gym users seeking e.g. low carbohydrate or high protein products, pre/post work out products or any variations thereof, particularly products containing carbohydrates, proteins and/or fats in given combinations and relative amounts.

As noted previously the preferred gels can be used as a delivery vehicle to deliver water soluble ingredients, water insoluble ingredients and lipids.

In a fourth embodiment the gel of the invention is used to deliver ingredients in the form of an entrapped stable emulsion.

The lipid component, for example omega 3 or water insoluble vitamins, is emulsified with the water, usually with stirring, and then caused to gel. Additional emulsifying agents may be added to facilitate the emulsification prior to gelling.

Typical food grade or pharmaceutical grade emulsifiers, such as, for example a lecithin, esters of monoglycerides of fatty acids and mono and di glycerides of fatty acids are added.

In a fifth embodiment the gel of the invention is used to deliver ingredients in the form of a stable solid particulate suspension or dispersion.

Preferably the solid particles are nano-sized particles (greater than 1 nanometer and less than 1 micron.)

In a sixth embodiment the gel of the invention is used to deliver ingredients in the form of a solution.

Of course, in a seventh embodiment, and one which is particularly favoured, the oral dosage form of the invention can be used to combine health ingredients from any combination of the fourth, fifth and sixth aspects in a single dosage form.

Advantageously the invention allows for large volumes of different nutrients (e.g. greater than 500 mg) to be delivered in a user-friendly format, where pills and capsules may not be not possible or practical or would be undesirably big. Further, the invention allows for formulating liquid nutrients which would not be sufficiently stable in water alone, yet which, in the gel format are stable. Thus, the provision of multi-phase combinations is particularly advantageous. For example, an ingredient may be more stable in a solid phase as a suspension or dispersion or as an oil in water emulsion. The set gel formed can trap & immobilise multiple phases enhancing stability as well as e.g. masking taste. The set gel is easily sheared during delivery to form new wet interfaces thereby facilitating delivery.

By combining two functionally different gelling agents Applicant has achieved a novel robust firm gel platform that enables the delivery of a wide range of health ingredients with improved properties e.g. improved ingredient loading, taste masking, versatility etc, and by trapping them in a firm gel that shears when delivered and ingested, the products are very easy to swallow and overcome dysphasia issues.

In its stored state the formulation has a firm jelly form, is stable at room temperature, but when sucked or otherwise subjected to a gentle force, shears to create new wet interfaces which facilitate swallowing. Swallowing is eased because the gel interfaces created are slippery because they are inherently wet, due to the water within the structure.

Unlike known viscous paste gel formulations, the set firm gels leave minimal residue other than a water film, making them much easier to swallow as a set gel than other solid/semi-solid formats. This novel formulation of the invention can be flavoured to further enhance taste masking.

This novel formulation provides a chemically and physically stable matrix which can be used to entrap water soluble components, non-water soluble lipids, and lipid soluble components alike.

As a result of the entrapment, there is a reduced surface contact to taste buds. Unlike viscous paste gels, the gels of the present invention provide minimal residues, other than displaced water, and are very much easier to swallow as a set jelly will shear on sucking in contrast to alternative solid/semi-solid formats that are plastic (not elastic).

Advantageously, because they shear, they release components quickly, even in high doses, and do so with taste masking.

Unlike tablets or capsules the platform is highly flexible in allowing different health ingredients to be provided in combinations in a single dosage form which has benefits over the alternatives currently on offer.

The products, such as the glucose products which address hypoglycaemic episodes, can be used alongside wearable devices and digital support programs to improve health management. Thus, the products may be used with digital apps and wearables such as Fitbit, which enable a subject to better manage their condition, such as, for example, diabetes by tracking e.g. symptoms and indicators together with the medication/health products taken. This provides better informed subjects as well as enhanced compliance and improved clinical/health outcomes.

Advantageously the invention allows for delivery in a form that does not require a separate drink, unlike tablets or capsules that need a drink to help swallowing, and unlike most exercise gels, which would be better described as thick pastes, that require additional fluids due to mouth feel from paste residue.

The presence of an alginate means that some beneficial calcium salts are incorporated as part of the gelling process. Thus, for formulations directed towards bone health Calcium and/or Magnesium salts (e.g. calcium citrate or carbonate) will aid gelation by complexing. Calcium citrate may also enhance flavour. Calcium bicarbonate may induce an effervescent effect, which may provide an attractive taste sensation.

Solid suspensions may include nano-milled materials, such as, curcumin or glucosamine in a format which may enhance their bioavailability.

Whilst Agar and Locust Bean Gum set well, the appearance is unattractive. Agar and Xanthan gum provides a clearer gel, without coloured specks. However, Agar and alginate gels are most preferred, as these appear, visually very clear, but more importantly the alginate cross links provide a more structured gel with a different gelling mechanism to the carbohydrate non-ionic gelled polymers improving versatility and performance.

However, adding Ca, Mg and Zn salts, such as chloride or citrate, interferes with the setting of Agar and some other gum polymers. Thus, to obtain good setting results Agar and Alginate should be used in particular ratios (w/w). The preferred ratios favour an excess of agar to alginate, and thus a ratio of between 8:1 to 1:1, more preferably 5:1 to 1:1 and most preferably about 3:1 Agar to Alginate is preferred. The Agar acts as an emulsifier and gelling agent, whilst the alginate together with the metal 2+ ions (Ca2+, Mg2+, Zn2+) form a structured gel counteracting the effect of these ions where only Agar is present.

Agars and alginates are both suitable for vegans, vegetarians and most religious diets whereas gelatine is not, as it's an animal protein, usually obtained from pigs.

The advantage of combining agar and alginate gels is that they are less sensitive to temperature effects than other gelling agents. They are also less affected by components that may inhibit gelation, such as oils, changes in pH, and high concentrations of complex carbohydrates, such as, maltodextrins. Agar and alginate gels also tend to be faster setting, which is an advantage in manufacturing, facilitating faster and more robust production.

The lipids used in the practising of the invention included any suitable food grade oil of animal or plant origin. Non-limiting examples include: corn oil, olive oil, sunflower oil, coconut oil and fish or algal oils. Fish and algal oils are especially advantageous, as a source of omega 3, particularly DHA and EPA, both of which are important dietary constituents. The lipid material may advantageously include lipid vitamins such as any of vitamin D or vitamin E.

Flavouring components may be included. Any food grade flavours such as fruits including lemon, lime, orange, passionfruit, or vanilla, or mint, or rose water may be used. Also flavouring oils may be used such as coconut oils.

In addition—compliance of animal species such as pets, farm animals, or other domesticated animals for veterinary products is a challenge, as it can be very challenging for animal carers to ensure animals consume oral delivery forms such as tablets or capsules or powders.

The benefits can also be provided to improve veterinary product compliance.

Benefits of the invention include:
Taste masking: The gels of the invention allows any mixture of nutrients and most poor, strong & unpleasant flavours—such as bitterness, sweetness, fish oils, curcumin (spice/peppery) to be masked.
Large volumes of nutrients may be formulated in one easy to consume dosage form: Multiple ingredients and large doses can be combined in a single dosage form.
Overcomes choking risks posed by large tablets: Gels are much easier to swallow than pills. The format aids all swallowing issues, whether young children or the elderly or merely those who have a predisposed swallowing problem.
Fast acting or targeted delivery: The set gel allows the relevant nutrients to be released quickly in the relevant parts of the digestive system. Even for large doses, these are fast acting—for example, glucose can be released quickly in response to a hypo-glycaemic event.
Stable at room temperature. The gel nature provides stability without the need for cold storage.
Includes water as an ingredient. The presence of "locked up" but "releasable" water also ensure hydration is achieved, and no additional fluids are required to enable the product to be swallowed. This also helps aid digestion and provides an improved mouth feel.

BRIEF DESCRIPTION OF THE DRAWINGS

Embodiments of the invention are further described hereinafter with reference to the accompanying drawings, in which:

The FIGURE is an illustration of a dispensing dosage form of the invention.

DETAILED DESCRIPTION

A preferred base gel (25 ml), into which a plurality of ingredients promoting health or well-being (not shown) are added, particularly nutritional ingredients, comprises agar and alginate as set out in Table 5 below:

TABLE 5

| Ingredient | *Weight (g) plus/minus 30% | % w/w | Function |
| --- | --- | --- | --- |
| Sorbic acid | 0.035 g | 0.14% | Preservative |
| Calcium ascorbate | 0.600 g | 2.32% | pH adjustment; nutritional supplement and alginate gel linker |
| Water | 25.000 g | 96.58% | Solvent |
| Agar agar | 0.188 g | 0.73% | Primary gelling agent |
| Sodium alginate | 0.063 g | 0.24% | Secondary gelling agent |

Note—the weights are scaled to the desired formulation volume and are provided here with respect to 25 ml water.

The pH is adjusted to a pH of about 5.0. This is within the stable pH range for agar agar, the primary gelling agent.

Calcium ascorbate may be replaced by an equivalent amount of calcium citrate or another divalent anion salt.

It will be appreciated that this specific example is merely illustrative, and the ingredients and their respective amounts will vary, depending on the health ingredients to be added as illustrated in Examples 2-8.

The general process for the preparation of a gel formulation is set out in Example 1 below:

Example 1

Any water-soluble ingredients are dissolved in food grade water first. These may include a nutritional ingredient such as glucose, as well as preservatives and dilute acids (for pH control). An exemplary preservative is potassium sorbate, and an exemplary pH control agent is a weak acid, such as, citric acid, ascorbic acid, acetic acid or dilute HCl.

To facilitate efficient addition of the gelling agent(s), the solution is preferably stirred and heated to near boiling. The agar and sodium alginate are added slowly, to allow for gradual hydration, with steady constant stirring, ensuring satisfactory dispersion or dissolution. The dispersion or solution is kept at or around boiling point for a time, between 4-5 minutes, sufficient to ensure proper hydration, especially of the agar. It is then filled into sachets and allowed to cool such that it forms a firm gel.

The sachet may be as illustrated in the FIGURE. The pouch (1) is formed from, for example, plastics or foil layers that are sealed together around an edge (3) incorporating a filling and dispensing aperture comprising a plug (4), spout (5) and cap (6). The pouch is filled through the mouth piece (5) and is secured with a cap (6) which may be provided with a frangible seal. In use the subject removes the cap and drinks the gel by squeezing it and/or sucking it from the pouch (1) through the spout (5).

When preparing the gel it is desirable to limit the heating period to minimise water loss from evaporation as excessive evaporation can lead to product variability.

Preferably the agar is used in concentrations of between 0.001 g (1 mg) and 0.02 g (20 mg) per gram of water. More preferably between 0.005 g (5 mg) and 0.01 mg (10 mg) per gram of water, and most preferably between 0.006 g (6 mg) and 0.009 g (9 mg) mg per gram (equivalent to 1 ml) of water.

Preferably the alginate is used in concentrations of between 0.0005 g (0.5 mg) and 0.01 g (10 mg) per gram of water. More preferably between 0.001 g (1 mg) and (0.008 g (8 mg) per gram of water, and most preferably between 0.001 g (1 mg) and 0.005 g (5 mg) per gram of water.

A source of divalent ions is added to enhance the alginate gel formation. Suitable ingredients include calcium, zinc and/or magnesium salts. For example, calcium citrate, magnesium citrate or zinc citrate are good forms of soluble salts and can also provide mineral supplementation. Other salts may however be used.

Whilst hot, any lipid component may be added, and is allowed or encouraged to facilitate formation of a suitable emulsion. Typically, the lipid level may be added in concentrations of 0.1 to 10% w/w of the water. More preferably between 1% and 5% w/w of the water, and most preferably between 3 mg and 5 mg per gram of water.

A mechanical homogeniser, such as a Silverson homogeniser, is advantageously used to facilitate the formation of an emulsion. Any known food grade emulsifier may be added to improve the emulsion quality and physical stability, such as, for example, a lecithin. Preferably the emulsifier is non-animal sourced, such as soya lecithin, rather than egg lecithin.

In an advantageous process the emulsion may be made as a separate cool water mix precursor, and is combined with a separate hot agar-alginate in water precursor, (the water being split as appropriate) to speed cooling and gel formation.

A further component of a solid suspension may be dispersed into the water composition. Where a nutritional component is neither water or lipid soluble, this may be prepared as a suspension in either lipid or water. It is advantageous if this component is milled to a fine particle size, as this may improve suspension stability, and may also improve bioavailability. Advantageously the insoluble component may be milled in wet or dry conditions, and may be ball milled, or media milled or nano-milled or milled in a high shear homogeniser. The milling may be conducted in the presence of a milling aid, such as leucine, sodium lauryl sulphate, and metal stearates.

After heating, this liquid formulation can be metered hot into the desired containers and allowed to set as a gel.

More specifically for e.g. a product for hypoglycaemia, during the manufacturing processing the following are undertaken:

The pH is adjusted—ideally to between 4 and 6, most preferably about 5. This is within the stable pH range for agar agar, the primary gelling agent.

Generally, the ratio of HCl:Water is 0.80:100.00 mL. For example, if 40 ml of water is added to the gel, 0.32 mL of 0.1 M HCl is also added. In case HCl is not permitted for use in commercial production, an alternative organic acid is selected, such as citric acid or acetic acid.

The gel production process involves the following:
Weigh the non-gelling agents (e.g. glucose, sorbic acid, water) in appropriate scaled quantities and add them to a suitable mixing vessel, in the order of e.g. Glucose (or other carbohydrate) as required; Sorbic acid or other preservative as needed, and food grade water. Use an appropriate dispenser to add hydrochloric acid (or alternative acid) into the vessel.

Apply steady stirring, e.g. at lab scale this is a magnetic stirrer bar. Cover to minimise evaporation and water loss.

Pre-weigh the specified nutrients required for composition. Mix these non-gelling ingredients while applying heat to the vessel contents. Add one nutrient at a time to the vessel, and allow for it to be fully dispersed and dissolved, then add the next nutrient. When all the nutrients have been added, allow to mix for an additional 2-3 minutes.

Pre-weigh the gelling agents (agar agar and sodium alginate).

When all the gelling agents have been added, stir for an additional 2-3 minutes to ensure all the agents that have been incorporated are no longer visible. Where insoluble components are used, incorporate using a homogeniser.

Where oils/lipid components are used, after immediately removing from heat, and before cooling occurs, add the oil/lipid materials, and mechanically emulsify to suitable milky appearance using a homogeniser.

Allow for the formulation to cool and gel.

The Bloom test is used to characterise the resulting grade of the set gel. Preferably, a Bloom grade of at least 80, through 90, 100, 110, 120, 130 and 140 is obtained.

Preferably, a Bloom grade of less than 250, less than 220, less than 200 to less than 180 is obtained.

An optimal Bloom grade of between 140 and 180 is desired.

In the preferred embodiment the invention provides a unique platform for the delivery of multiple health ingredients though the use of two gelling agents with different gelling mechanisms, particularly, agar and alginate. The use of an ionic gelling agent counters the gel inhibition effects that the different health ingredients (e.g. oils, divalent ions, polysaccharides) may have on a carbohydrate gelling agent such as Agar.

This enhanced gel platform, which is the subject of the second aspect of the invention, is illustrated further with reference to some exemplary formulations, which relate particularly to the $3^{rd}$ to $5^{th}$ aspects of the invention.

A number of formulations address hypoglycaemic events. The following variants (Examples 2 to 5) have been demonstrated with a host of additives in addition to glucose including examples which include the addition of lipids, water insoluble vitamins, trace elements, and minerals.

Example 2

Child specific gel for hypoglycaemia as Table 6.

TABLE 6

| Ingredient | Weight (g) plus/minus 30% | Function |
| --- | --- | --- |
| Dextrose monohydrate (glucose) | 15.000 g | Sugar |
| Sorbic acid | 0.035 g | Preservative |
| Calcium ascorbate | 0.600 g | Divalent cation |
| Water | 15.000 g | |
| Cholecalciferol (Vitamin D3) powder | 0.5 µg | Vitamin |
| Agar agar | 0.188 g | Primary gelling agent |
| Sodium alginate | 0.063 g | Secondary gelling agent |
| Sub-Dispersion B1 | See Table 6.1 below | |

TABLE 6.1

Sub-Dispersion B1

| Ingredient | Weight (g) plus/minus 30% | Function |
| --- | --- | --- |
| Lecithin | 0.125 g | emulsifier |
| Water | 9.000 g | |
| Omega 3 | 0.500 g | lipid |

Example 3

Basic adult gel for hypoglycaemia as Table 7

TABLE 7

| Ingredient | Weight (g) plus/minus 30% | Function |
| --- | --- | --- |
| Dextrose monohydrate (glucose) | 15.000 g | Sugar |
| Sorbic acid | 0.035 g | Preservative |
| Calcium ascorbate | 0.600 g | Divalent cation |
| Water | 25.000 g | |
| Agar agar | 0.188 g | Primary gelling agent |
| Sodium alginate | 0.063 g | Secondary gelling agent |

Example 4

Pregnancy specific gel for hypoglycaemia as Table 8

TABLE 8

| Ingredient | Weight (g) plus/minus 30% | Function |
| --- | --- | --- |
| Dextrose monohydrate (glucose) | 15.000 g | Sugar |
| Sorbic acid | 0.035 g | Preservative |
| Water | 16.000 g | |
| Cholecalciferol (Vitamin D3) powder | 0.5 µg | Vitamin |
| Ginger | 25.000 mg | Plant extract |
| Agar agar | 0.188 g | Primary gelling agent |
| Sodium alginate | 0.063 g | Secondary gelling agent |
| Sub-Dispersion B2 | See Table 8.1 below | |

TABLE 8.1

Sub-Dispersion B2

| Ingredient | Weight (g) plus/minus 30% | Function |
| --- | --- | --- |
| Lecithin | 0.250 g | Emulsifier |
| Water | 8.000 g | |
| Omega 3 | 1.000 g | lipid |

Example 5

Elderly specific gel for hypoglycaemia as Table 9

TABLE 9

| Ingredient | Weight (g) plus/minus 30% | Function |
| --- | --- | --- |
| Dextrose monohydrate (glucose) | 15.000 g | Sugar |
| Sorbic acid | 0.035 g | Preservative/pH |
| Calcium ascorbate | 0.600 g | Divalent cations |
| Water | 16.000 g | |
| Cholecalciferol (Vitamin D3) powder | 0.5 µg | Vitamin |
| Agar agar | 0.188 g | Primary gelling agent |
| Sodium alginate | 0.063 g | Secondary gelling gent |
| Sub-Dispersion B2 | See Table 9.1 below | |

TABLE 9.1

Sub-Dispersion B2

| Ingredient | Weight (g) plus/minus 30% | Function |
| --- | --- | --- |
| Lecithin | 0.250 g | Emulsifier |
| Water | 8.000 g | |
| Omega | 1.000 g | Lipid |

In addition to the examples with glucose, a number of Examples illustrating the forth aspect of the invention have been prepared. The following variants (Examples 6 and 7) are illustrative thereof:

Example 6

Travel (pre-flight) gel formulation as Table 10

TABLE 10

| Ingredient | Mid-Weight (Range is +/− 30%) | Function |
| --- | --- | --- |
| Glucose | 5.000 g | Sugar |
| Sorbic acid | 0.056 g | Stabiliser/pH |
| Water | 40.000 g | |
| Calcium ascorbate | 0.600 g | Divalent cations |
| Antioxidants- Omega fats and glutathione | 1 g in food grade oils: | Anti-oxidant |
| Ginseng | 100 mg | Plant extract |
| Magnesium | 33.00 mg | Metal |
| Polyphenol | | Plant Extract |
| Rhodiola Rosea (Golden root) | 50.000 mg | Plant Extract |
| Vitamin B1 (Thiamine) | 0.200 mg | Vitamin |
| Vitamin B12 (Cyanocobalamin) | 0.200 µg | Vitamin |
| Vitamin B2 (Riboflavin) | 0.100 mg | Vitamin |
| Vitamin B3 (Niacin) | 4.200 mg | Vitamin |
| Vitamin B5 (Pantothenic acid) | 0.500 mg | Vitamin |
| Vitamin B6 (Pyridoxine) | 0.100 mg | Vitamin |
| Vitamin C (L-ascorbic acid) | 12.600 mg | Vitamin |
| Vitamin D (Cholecalciferol) | 0.500 µg | Vitamin |
| Vitamin E (Tocopherol) | 0.100 mg | Vitamin |
| Zinc | 1.200 mg | Metal |
| Agar agar | 0.300 g | Primary gelling agent |
| Sodium alginate | 0.100 g | Secondary gelling agent |

Example 7

Travel (post-flight) gel formulation as Table 11

| Ingredient | Mid-Weight (Range is +/− 30%) | Function |
| --- | --- | --- |
| Glucose | 15 g | Sugar |
| Sorbic acid | 0.056 g | Preservative |
| Water | 40.000 g | |
| 0.1M Hydrochloric acid (HCl) | 0.320 mL | pH control |
| Antioxidants- Omega fats and glutathione | with 1 g food grade oils: | |
| Calcium | 85.00 mg | Gelling cation |
| Magnesium | 33.00 mg | Element |
| Melatonin | 0.200 mg | Hormone |
| Polyphenol | | Anti-oxidant |
| Vitamin B1 (Thiamine) | 0.200 mg | Water soluble vitamin |
| Vitamin B12 (Cyanocobalamin) | 0.200 µg | Water soluble vitamin |
| Vitamin B2 (Riboflavin) | 0.100 mg | Water soluble vitamin |
| Vitamin B3 (Niacin) | 4.200 mg | Water soluble vitamin |
| Vitamin B5 (Pantothenic acid) | 0.500 mg | Water soluble vitamin |
| Vitamin B6 (Pyridoxine) | 0.100 mg | Water soluble vitamin |
| Vitamin C (L-ascorbic acid) | 12.600 mg | Water soluble vitamin |
| Vitamin D (Cholecalciferol) | 0.500 µg | Fat soluble vitamin |
| Vitamin E (Tocopherol) | 0.100 mg | Fat soluble vitamin |
| Zinc | 1.200 mg | Element |
| Agar agar | 0.300 g | Primary non-ionic gelling agent |
| Sodium alginate | 0.100 g | Secondary ionic gelling agent |

Example 8

A meal replacement gel, designed for use in remote locations or in disaster impact relief, is illustrated with reference to Table 12
The Basic Gel Composition (to be Scaled Depending on Nutrients Added)

TABLE 12

Basic Gel Composition

| Ingredient | * Mid-Weight (Range is +/− 30%) | % w/w | Function |
|---|---|---|---|
| Sorbic acid | 0.035 g | 0.14% | Preservative |
| Calcium ascorbate | 0.600 g | 2.32% | pH adjustment; Divalent cations |
| Water | 25.000 g | 96.58% | Solvent |
| Agar agar | 0.188 g | 0.73% | Primary gelling agent |
| Sodium alginate | 0.063 g | 0.24% | Secondary gelling agent |

To the base gel are introduced nutritional ingredients from the following groups:
Proteins optionally including one or more of: milk protein concentrate, whey protein concentrate, soya protein isolate, sodium caseinate in amounts to meet a minimum RDI or a percentage thereof, e.g. 50% (twice a day) or 33% (3 times a day) and Amino Acids optionally including one or more of: L-Glutamine, L-Glycine, L-Leucine, L-Isoleucine, L-Valine, Beta Alanine, L-Arginine, and Taurine.
Carbohydrates and sugars optionally including on or more of: maltodextrin, inulin, fructose, and glucose syrup in amounts to meet a minimum RDI or a percentage thereof, e.g. 50% (twice a day) or 33% (3 times a day).
Dietary Fats optionally including one or more of: vegetable fats and oils, fish oils, coconut oil, mono and diglycerides of fatty acids, and lecithin in amounts to meet a minimum RDI or a percentage thereof, e.g. 50% (twice a day) or 33% (3 times a day).

In addition to these three, core energy providing groups the product may further comprise one or more essential nutritional ingredients from the following groups:
Vitamins optionally including one or more of: Vitamin C (Ascorbic Acid), Vitamin K (Menaquinone-7), Vitamin E (dl-Alpha Tocopheryl Acetate), Niacin (Niacinamide), Vitamin A (Retinyl Acetate), Pantothenic Acid (Calcium D-Pantothenate), D-Biotin, Folic Acid, Vitamin D (Cholecalciferol), Vitamin B6 (Pyridoxine Hydrochloride), Riboflavin (Riboflavin 5 Phosphate Sodium), Thiamine (Thiamine Hydrochloride), Vitamin B12 (Cyanocobalamin), Creatine Monohydrate, beta carotene, lutein, lycopene oleoresin, choline chloride, L-carnitine, nicotinamide, calcium D-pantothenate, riboflavin, pyridoxine hydrochloride, pteroylmonoglutamic acid, phytomenadione, resveratrol, Alpha Ketoglutarate, Calcium Hydroxy Methylbutyrate (HMB), and Tricreatine Malate; and
Essential minerals, sources and salts, optionally including one or more of: Tri-potassium Citrate, Sodium Chloride, Tri-sodium Citrate, Magnesium Oxide, Zinc Gluconate, Iron Fumarate, Manganese Gluconate, Copper Gluconate, Potassium Iodide, Sodium Molybdate, Chromium Picolinate, sodium selenite, chromium chloride, potassium iodide, sodium fluoride, sodium chloride, potassium chloride, calcium hydroxide, sodium ascorbate, magnesium hydroxide potassium hydroxide, ferrous lactate, zinc sulphate, and manganese sulphate and Phosphates optionally including: sodium triphosphate, tricalcium phosphate, and potassium phosphate.

These additional optional ingredients may be further supplemented with:
Antioxidants, optionally including ascorbyl palmitate, and alpha tocopherol.
Flavouring and Sweeteners, and a pH modifier, such as: citric acid or ascorbic acid.

It will be appreciated that the skilled nutritionist will be able to formulate multiple variations of the above using their general skill and knowledge to address various needs Including making adult, child, baby specific whole meal formulations and Example 8 is merely intended to reflect the possibilities open to the skilled person.

The invention claimed is:

1. An oral dosage form, other than a 50 g or 75 g dose of glucose, allowing dose combinations of two or more health ingredients selected from at least one of water soluble, water insoluble and lipid-based ingredients to be formulated together in a single dosage form, which is a drinkable gel with a volume of between 25 ml and 250 ml, wherein the health ingredients are retained in a delivery system comprising:
water,
a gelling agent that is a combination of a carbohydrate non-ionic gelled polymer gelling agent and a polyvalent ion gelled polymer gelling agent,
a divalent cation comprising calcium ($Ca^{2+}$),
a pH adjuster which ensures the oral dosage form has a pH of 5 to 7, and
wherein the carbohydrate non-ionic gelled polymer gelling agent is an agarose-based polymer gelling agent, the polyvalent ion gelled polymer gelling agent is an alginate-based polymer gelling agent provided in an amount of between 0.0005 g (0.5 mg) and 0.01 g (10 mg) per gram of water, and the agarose-based polymer gelling agent and the alginate-based polymer gelling agent are present in a weight ratio of about 3:1, and are present in amounts which ensure hydration of, and the formation of a firm gel with a bloom grade of between 100 and 250, and which does not exhibit plastic behaviour upon stress, but rather behaves elastically upon stress, to a failure point where the structure of the gel breaks or shears to irreversibly create new interfaces, making it more fluid when ingested, such that it is a drinkable gel.

2. The oral dosage form as claimed in claim 1, wherein the pH is 5.

3. The oral dosage form as claimed in claim 1, further comprising one or more preservatives.

4. The oral dosage form as claimed in claim 3, wherein the one or more preservatives is sorbic acid.

5. The oral dosage form as claimed in claim 1, comprising one or more water-soluble health ingredients.

6. The oral dosage form as claimed in claim 5, wherein the one or more water-soluble health ingredients are selected from a group comprising: water soluble vitamins, carbohydrates, sugars, and amino acids.

7. The oral dosage form as claimed in claim 1, comprising one or more water-insoluble health ingredients.

8. The oral dosage form as claimed in claim 7, wherein the one or more water-insoluble health ingredients comprises a dispersion or suspension forming health ingredient.

9. The oral dosage form as claimed in claim 8, wherein the dispersion or suspension forming health ingredient includes at least one of water insoluble trace elements, proteins, minerals and plant extracts.

10. The oral dosage form as claimed in claim 1, comprising one or more lipid soluble health ingredients.

11. The oral dosage form as claimed in claim 10, wherein the one or more lipid soluble health ingredients are selected from a group comprising: oils, DHA, EPA and lipid soluble vitamins D and E.

12. The oral dosage form as claimed in claim 10, further comprising an emulsifying agent.

13. The oral dosage form as claimed in claim 1, further comprising one or more of carbohydrates, proteins, fats, vitamins, minerals, lipids, trace elements, and plant extracts.

14. The oral dosage form as claimed in claim 1, comprising a meal replacement containing at least one third of a recommended daily intake of protein, carbohydrate and fat.

15. The oral dosage form as claimed in claim 1, wherein the alginate-based polymer gelling agent is calcium alginate.

16. The oral dosage form as claimed in claim 14, comprising at least half of a recommended daily intake of at least one of protein, carbohydrate and fat.

17. The oral dosage form as claimed in claim 1, wherein the pH adjuster includes hydrochloric acid (HCl).

18. The oral dosage form as claimed in claim 1, which is packaged in a pouch with a spout or with a straw for facilitating the ingestion of gel formation by at least one of squeezing and sucking.

19. A method for the delivery of dose combinations of two or more health ingredients selected from at least one of water soluble, water insoluble and lipid-based ingredients comprising:

ingesting a dosage form, other than a 50 g or 75 g dose of glucose, by squeezing and/or sucking the dosage form as a drinkable gel with a volume of 35 ml and 250 ml from a package comprising a pouch with a straw, wherein the two or more health ingredients are retained in a delivery system comprising:

Water, a gelling that is a combination of a carbohydrate non-ionic gelled polymer gelling agent and a polyvalent ion gelled polymer gelling agent, a divalent cation comprising calcium ($Ca^{2+}$), a pH adjuster which ensures the oral dosage form has a pH of 5 to 7, and wherein the carbohydrate non-ionic gelled polymer gelling agent is an agarose-based polymer gelling agent, the polyvalent ion gelled polymer gelling agent is an alginate-based polymer gelling agent provided in an amount of between 0.0005 g (0.5 mg) and 0.01 g (10 mg) per gram of water, and the agarose-based polymer gelling agent and the alginate-based polymer gelling agent are present in a weight ratio of about 3:1, and are present in amounts which ensure hydration of, and the formation of a firm gel with a bloom grade of between 100 and 250, and which does not exhibit plastic behaviour upon stress, but rather behaves elastically upon stress, to a failure point where the structure of the gel breaks or shears to irreversibly create new interfaces, making it more fluid when ingested, such that it is a drinkable gel.

\* \* \* \* \*